(12) United States Patent
Liao

(10) Patent No.: US 11,561,638 B2
(45) Date of Patent: Jan. 24, 2023

(54) SINGLE LAYER CAPACITIVE TOUCH FORCE SENSOR

(71) Applicant: PIXART IMAGING INC., Hsin-Chu County (TW)

(72) Inventor: Chi-Chieh Liao, Hsin-Chu County (TW)

(73) Assignee: PIXART IMAGING INC., Hsin-Chu County (TW)

( * ) Notice: Subject to any disclaimer, the term of this patent is extended or adjusted under 35 U.S.C. 154(b) by 3 days.

(21) Appl. No.: 17/316,345

(22) Filed: May 10, 2021

(65) Prior Publication Data
US 2022/0357829 A1    Nov. 10, 2022

(51) Int. Cl.
*G06F 3/041*      (2006.01)
*G06F 3/044*      (2006.01)

(52) U.S. Cl.
CPC ........ *G06F 3/04144* (2019.05); *G06F 3/0443* (2019.05); *G06F 3/0446* (2019.05); *G06F 3/04164* (2019.05)

(58) Field of Classification Search
CPC .............. G06F 3/04144; G06F 3/0446; G06F 3/04164; G06F 3/0443
See application file for complete search history.

(56) References Cited

U.S. PATENT DOCUMENTS

| | | | |
|---|---|---|---|
| 2014/0062933 A1* | 3/2014 | Coulson ................ | G06F 3/0447 345/174 |
| 2016/0062505 A1* | 3/2016 | Hwang ................... | G06F 3/047 345/174 |
| 2016/0188037 A1* | 6/2016 | Choi ..................... | G06F 3/0412 345/174 |

* cited by examiner

*Primary Examiner* — Afroza Chowdhury
(74) *Attorney, Agent, or Firm* — Hauptman Ham, LLP

(57) ABSTRACT

There is provided a touch force sensor including a first drive electrode, a second drive electrode and a receiving electrode. The first drive electrode is used to form a first capacitance with the receiving electrode. The second drive electrode is used to form a second capacitance with the receiving electrode. The receiving electrode shields the first drive electrode such that when a conductor approaches the receiving electrode, only the second capacitance is changed but the first capacitance is not changed. The first capacitance is changed only when the conductor gives a force upon the receiving electrode.

16 Claims, 6 Drawing Sheets

SINGLE LAYER CAPACITIVE TOUCH FORCE SENSOR

BACKGROUND

1. Field of the Disclosure

This disclosure generally relates to a three dimensional touch sensor and, more particularly, to a single layer capacitive touch force sensor.

2. Description of the Related Art

The already known force sensors include a resistive force sensor. By pressing on the resistive force sensor, resistance of the resistive force sensor is changed, and a pressing force can be identified by measuring a voltage on an equivalent resistor thereof or a current passing through the equivalent resistor. However, a variation of the resistance with the pressure is not linear, and generally a user needs to give a significant pressure to obtain a desired detection result such that the user experience is degraded.

Furthermore, in addition to detect a two dimensional position of a touch, the three-dimensional touch detection is required in some applications. One method of realizing a three-dimensional touch sensor is to stack two sensors in two layers, in which one layer is for the position detection and the other layer is for the force detection. However, because this three-dimensional touch sensor uses a two-layer structure, it has a larger thickness that is counter to the trend of thin type electronic devices.

Accordingly, the present disclosure further provides a single layer capacitive touch force sensor that realizes both the touch detection and the force detection by using a single layer projective capacitive sensor.

SUMMARY

The present disclosure provides a single layer (without stacking two sensors) capacitive touch force sensor that respectively detects a touch signal and a pressure signal using the same receiving electrode.

To achieve the above objective, the present disclosure provides a touch force sensor including a receiving electrode, a first drive electrode and a second drive electrode. The first drive electrode is arranged opposite to the receiving electrode, and is configured to generate a first capacitance with the receiving electrode. The second drive electrode is configured to generate a second capacitance with the receiving electrode. The receiving electrode is fully overlapped with the first drive electrode but is not overlapped with the second drive electrode.

Furthermore, the present disclosure further provides a touch force sensor including a plurality of receiving electrode, a first substrate, a plurality of first drove electrodes, a plurality of second drive electrodes, a second substrate and a polymer material layer. The first substrate is arranged with the plurality of receiving electrodes thereon in an array. The plurality of first drive electrodes is arranged opposite to the plurality of receiving electrodes, and is configured to generate a first capacitance with the plurality of receiving electrodes. The plurality of second drive electrodes is configured to generate a second capacitance with the plurality of receiving electrodes. The second substrate is arranged with the plurality of first drive electrodes and the plurality of second electrodes thereon in an array. The polymer material layer is arranged between the first substrate and the second substrate, and configured to have a dielectric constant variation while receiving a force to change the first capacitance. Each of the plurality of receiving electrodes is fully overlapped with the opposite first drive electrode but is not overlapped with the plurality of second drive electrodes.

In the touch force sensor of the present disclosure, the capacitance variation is identified by, for example, detecting a voltage variation or a variation of charging/discharging time. For example, the detection signal is a voltage signal, and a processor identifies the voltage variation or the variation of charging/discharging time according to the voltage signals at different times.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should he noted that, wherever possible, the same reference numbers will he used throughout the drawings to refer to the same or like parts.

The touch force sensor of the present disclosure realizes both the touch detection and the force detection only using a single piece projective capacitive touch sensor. The control circuit identifies the touch and the force according to the output signal from the same receiving electrode within a single frame period, or respectively identifies the touch and the force according to the output signals from the same receiving electrode within different frame periods.

Figure 1A:
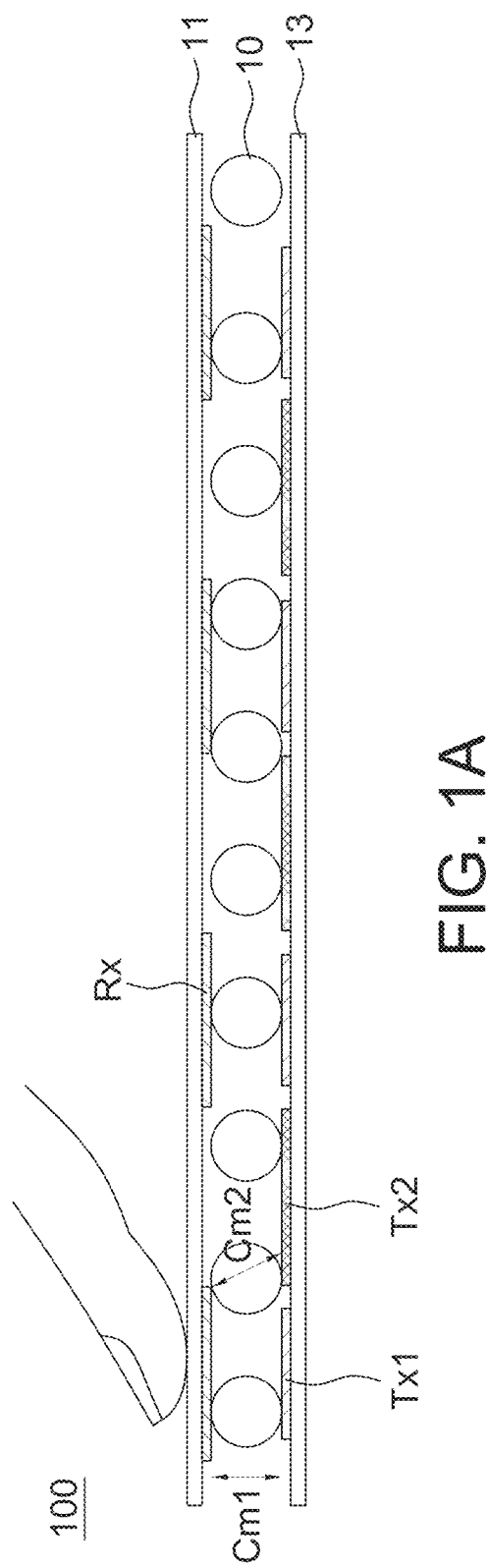
FIG. 1A is a cross-sectional view of a touch force sensor according to one embodiment of the present disclosure in which a finger touches thereon.
Figure 1B:
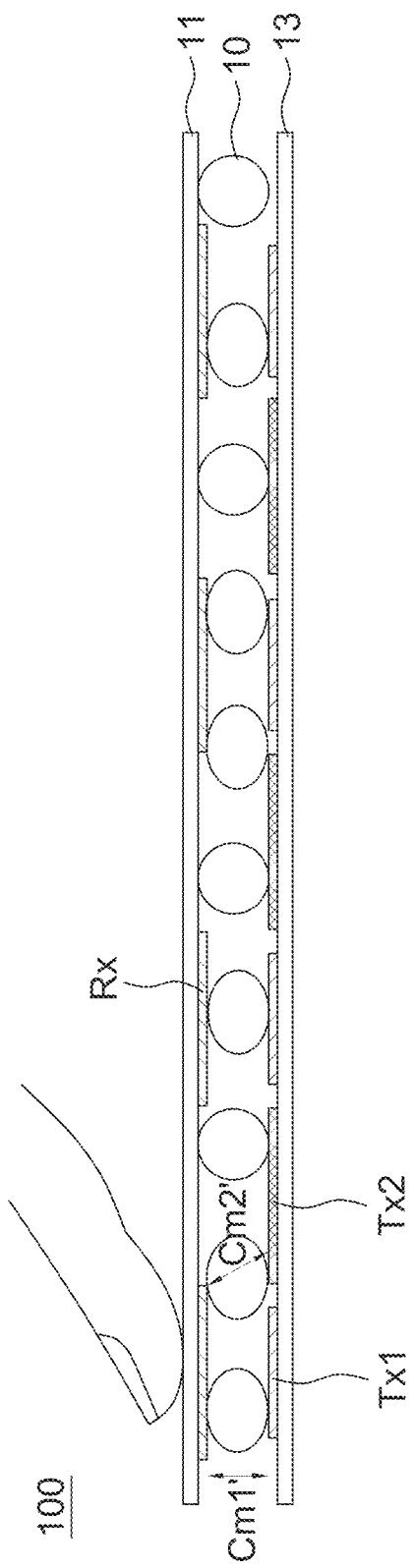
FIG. 1B is another cross-sectional view of a touch force sensor according to one embodiment of the present disclosure in which a finger presses thereon to compress the elastic layer.

Please refer to FIGS. 1A and 1B, it is a cross sectional view of a touch force sensor 100 according to one embodiment of the present disclosure, wherein FIG. 1A shows that a finger puts (without pressing) on the touch force sensor 100, and FIG. 1B shows that a finger gives a force on the touch force sensor 100 to change a distance between two substrates. It is appreciated that the one that approaches to or presses on the touch force sensor 100 is not limited to a finger but is another conductor, such as a touch pen.

The touch force sensor 100 includes a first substrate 11, a second substrate 13, a plurality of receiving electrodes Rx, a plurality of first drive electrodes Tx1, a plurality of second drive electrode Tx2, and an elastic layer 10 arranged between the first substrate 11 and the second substrate 13. It should be mentioned that although FIGS. 1A and 1B show that the elastic layer 10 is formed by multiple balls (or called spacers), they are only intended to illustrate but not to limit the present disclosure. The elastic layer 10 is selected from any suitable material or element as long as a distance between the first substrate 11 and the second substrate 13 is decreased when a finger gives a force thereon and is recovered after the force is removed. The first substrate 11 and the second substrate 13 are, for example, printed circuit boards or flexible substrates without particular limitations.

It should be mentioned that although FIG. 1A shows that the spacers are arranged at the same height and arranged to have a fixed pitch from one another, it is only intended to illustrate but not to limit the present disclosure. The spacers are randomly arranged in the space between the first substrate 11 and the second substrate 13, e.g., distributing in a glue.

Figure 2:
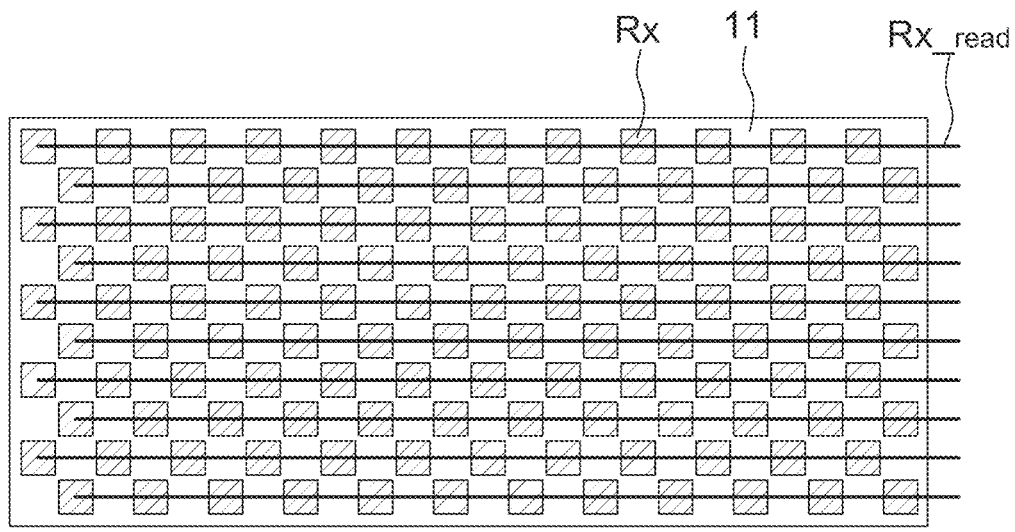
FIG. 2 is a schematic diagram of the arrangement of receiving electrodes of a touch force sensor according to one embodiment of the present disclosure.

Please refer to FIG. 2, the first substrate 11 is arranged with a plurality of receiving electrodes Rx in an array. Meanwhile, the first substrate 11 is further arranged with a plurality of readout lines Rx_read, and each of the readout lines Rx_read connects a row of receiving electrodes Rx in a first direction (e.g., a transverse direction in FIG. 2) to output a detection signal of every row of receiving electrodes Rx. Each receiving electrode Rx generates the detection signal when the corresponding drive electrode Tx1 or Tx2 receives a drive signal. The detection signals of different receiving electrodes Rx in one row are distinguished by, e.g., sending the drive signals of different corresponding drive electrodes at different periods, encoding the drive signals of different corresponding drive electrodes with different codes (generated by frequency and/or amplitude modulation). The distribution of the receiving electrodes Rx on the first substrate 11 is determined according to a sensing pattern of the sensing panel.

Figure 3A:
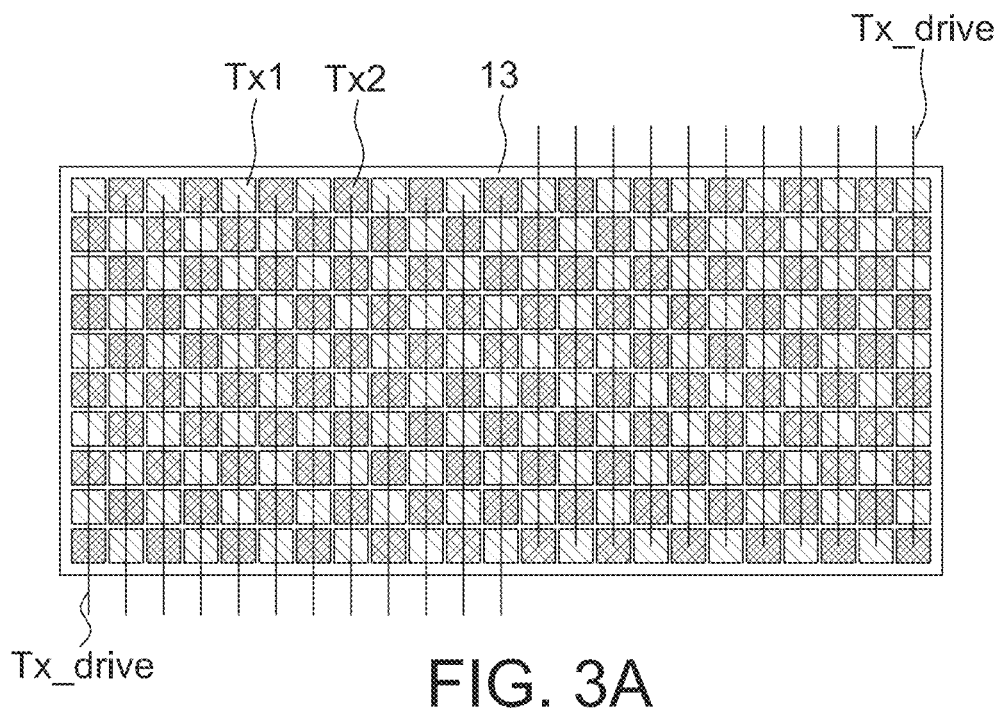
FIGS. 3A-3B are schematic diagrams of the arrangement of drive electrodes of a touch force sensor according to some embodiment of the present disclosure.

Please refer to FIG. 3A, the second substrate 13 is arranged with a plurality of first drive electrodes Tx1 and a plurality of second drive electrodes Tx2 in an array. Meanwhile, the second substrate 13 is further arranged with a plurality of drive lines Tx_drive, and each of the drive lines Tx_drive connects a column of first drive electrodes Tx1 and a column of second drive electrodes Tx2 in a second direction (e.g., a longitudinal direction in FIG. 3A), wherein the second direction is perpendicular to the first direction.

In another aspect, the plurality of drive lines Tx_drive are arranged transversely on the first substrate 11 and the plurality of readout lines Rx_read are arranged longitudinally on the second substrate 13.

Preferably, the plurality of first drive electrodes Tx1 and the plurality of second drive electrodes Tx2 are arranged in a chessboard pattern on the second substrate 13 (as shown in FIG. 3A) and at the same layer on the second substrate 13, but the present disclosure is not limited thereto. According to different applications, a part of regions on the second substrate 13 are arranged with the first drive electrodes Tx1 without arranging the second drive electrodes Tx2, and another part of regions on the second substrate 13 are arranged with the second drive electrodes Tx2 without arranging the first drive electrodes Tx1. The distribution of the first drive electrodes Tx1 and the second drive electrodes Tx2 on the second substrate 13 is determined according to a sensing pattern of the sensing panel.

Figure 3B:
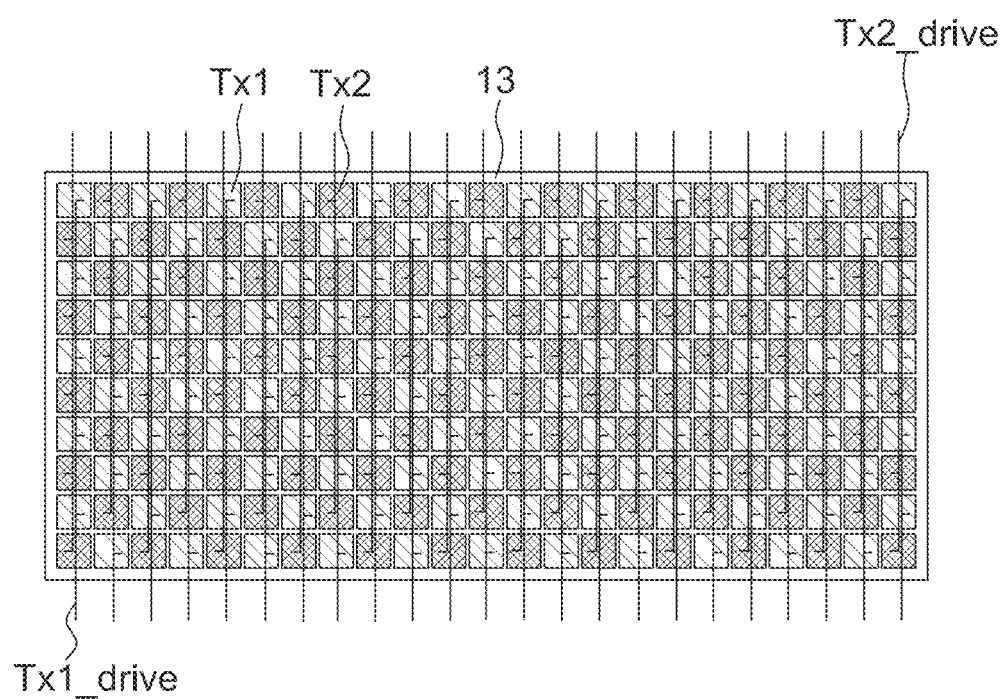

Please refer to FIG. 3B, it shows that a column of first drive electrodes Tx1 are connected and driven by one first drive line Tx1_drive (not connecting the second drive electrodes Tx2), and a column of second drive electrodes Tx2 are connected and driven by one second drive line Tx2_drive (not connecting the first drive electrodes Tx1). In this way, the first drive electrodes Tx1 and the second drive electrodes Tx2 are driven in different frame periods.

Furthermore, although FIG. 2 and FIGS. 3A-3B show that each of the receiving electrodes Rx, the first drive electrodes Tx1 and the second drive electrodes Tx2 have a rectangular shape, the present disclosure is not limited thereto. In other aspects, the receiving electrodes Rx, the first drive electrodes Tx1 and the second drive electrodes Tx2 have other shapes without particular limitations, such as a diamond shape, a circular shape or an ellipse.

Please refer to FIGS. 1A and 1B again, the first drive electrodes Tx1 are arranged opposite to the receiving electrodes Rx, and are used to generate a first capacitor having a first capacitance Cm1 with the receiving electrodes Rx when the first drive electrode Tx1 is driven. The second drive electrodes Tx2 are used to generate a second capacitor having a second capacitance Cm2 with the receiving electrodes Rx when the second drive electrode Tx2 is driven. When a finger approaches to or contacts (without pressing) an upper surface of the first substrate 11, the electric field between the receiving electrodes Rx and the second drive electrodes Tx2 is degraded to reduce the second capacitance Cm2; meanwhile, due to shielding by the receiving electrodes Rx, the electric field between the receiving electrodes Rx and the first drive electrodes Tx1 is barely or slightly affected by the finger and thus the first capacitance Cm1 is barely or slightly changed.

Accordingly, in order to well shielding the first drive electrodes Tx1 but not affecting the decrease of the second capacitance Cm2, preferably the receiving electrodes Rx are fully overlapped with the first drive electrodes Tx1 but not overlapped with the second drive electrodes Tx2. For example, an area of each of the receiving electrodes Rx is larger than or equal to an area of the opposite first drive electrode Tx1. By this arrangement, the elastic layer 10 is arranged between the receiving electrodes Rx and the first drive electrodes Tx1, and between the first substrate 11 (regions without the receiving electrodes Rx) and the second drive electrodes Tx2.

Although FIG. 1A shows that some spacers are not directly in contact with a lower surface of the first substrate 11, it is only intended to show a distance change from FIG. 1A to FIG. 1B but not to limit the present disclosure.

Figure 4:
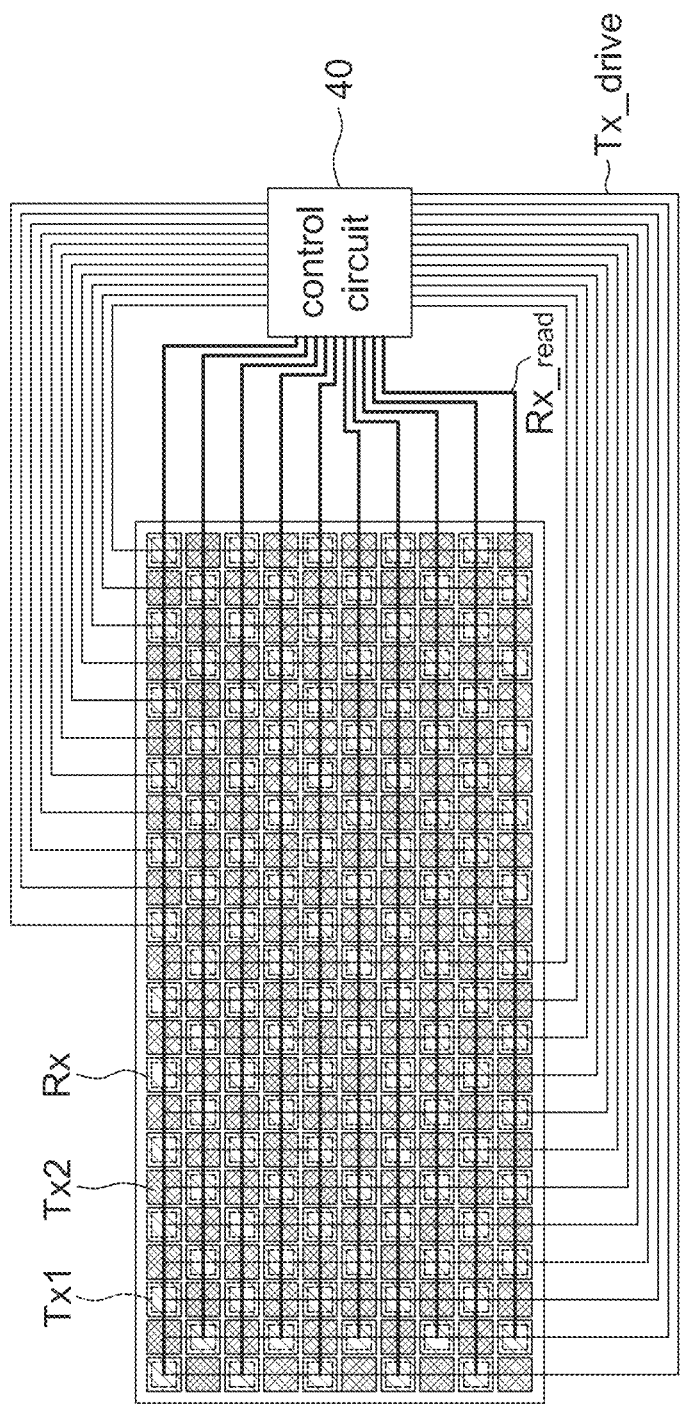
FIG. 4 is a schematic diagram of a control circuit connecting to a sensing panel of a touch force sensor according to one embodiment of the present disclosure.

Please refer to FIG. 4, it is a schematic diagram when the first substrate 11 is attached to the second substrate 13. The touch force sensor 100 of the present disclosure further includes a control circuit 40 connects to one column of first drive electrodes Tx1 and second drive electrodes Tx2 via a drive line Tx_drive, and connects to one row of receiving electrodes Rx via a readout line Rx_read. The control circuit 40 is arranged to drive the first drive electrodes Tx1 and the second drive electrodes Tx2 within the same frame period (e.g., in the aspect of FIG. 3A), or respectively drive the first drive electrodes Tx1 and the second drive electrodes Tx2 within different frame periods (e.g., in the aspect of FIG. 3B). The control circuit 40 includes, for example, a row decoder and a column decoder for transmitting drive signals to drive the first drive electrodes Tx1 and the second drive electrodes Tx2, and transmitting read signals to read the receiving electrodes Rx.

It should be mentioned that although FIG. 4 shows that the drive lines Tx_line and the readout lines Rx_read are respectively laid on the second substrate 13 and the first substrate 11 by passing the first drive electrodes Tx1 and the second drive electrodes Tx2 as well as the receiving electrodes Rx, the present disclosure is not limited thereto. In other aspects, the drive lines Tx_drive are laid on the second substrate 13 by passing the space between the first drive electrodes Tx1 and the second drive electrodes Tx2, and the readout lines Rx_read are laid on the first substrate 11 by passing the space between the receiving electrodes Rx without particular limitations as long as the drive lines Tx_drive are able to send drive signals to the first drive electrodes Tx1 and the second drive electrodes Tx2, and the detection signals are readable from the receiving electrodes Rx.

Figure 5A:
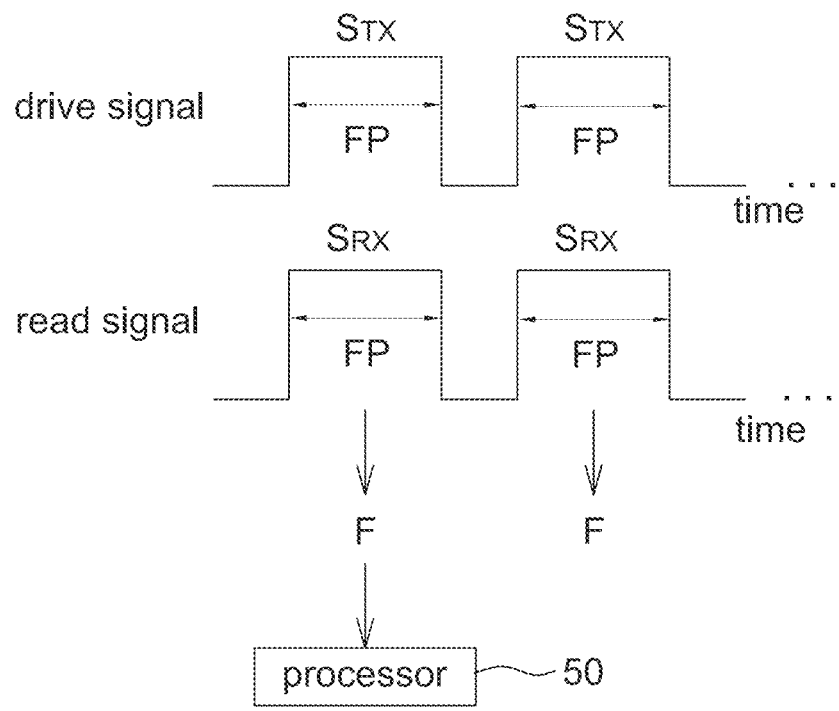
FIG. 5A is a signal timing diagram of a touch force sensor according to one embodiment of the present disclosure.

For example referring to FIGS. 5A and 3A, the control circuit 40 sends a drive signal (e.g., voltage signal $S_{TX}$) to each column of the plurality of first drive electrodes Tx1 and the plurality of second drive electrodes Tx2 within a frame period via the drive lines Tx_drive, and reads (e.g., by turning on reading switches in the control circuit 40 based on read signals $S_{RX}$) a detection signal of each row of the plurality of receiving electrodes Rx via the readout lines Rx_read, wherein the detection signal is, for example, a voltage signal. The detection signals of all receiving electrodes Rx form a signal frame F for the processor 50 to obtain the capacitance variation. For example, the processor 50 processes signal frames at a predetermined frequency.

The processor 50 is, for example, a microcontroller unit (MCU) or an application specific integrated circuit (ASIC) that is embedded in the control circuit 40. The processor 50 identifies a force according to a variation of the first capacitance Cm1 and identifies a touch according to a variation of the second capacitance Cm2 using hardware and/or firmware. For example, when a finger approaches to or contacts on the first substrate 11 as shown in FIG. 1A, the second capacitance Cm2 is reduced but the first capacitance Cm1 is not changed. When the finger gives a force on the first substrate 11 as shown in FIG. 1B, the second capacitance Cm2 and the first capacitance Cm1 are respectively increased to Cm1' and Cm2' due to a distance between the first substrate 11 and the second substrate 13 being decreased.

In the aspect shown in FIG. 3B, the processor 50 identifies the force according to the first capacitance Cm1 without according to the second capacitance Cm2 (e.g., driving only via the first drive lines Tx1_drive), and identifies the touch according to the second capacitance Cm2 without according to the first capacitance Cm1 (e.g., driving only via the second drive lines Tx2_drive).

In one aspect, to increase the position accuracy, before identifying a force position, the processor 50 performs interpolation on the variation of first capacitance Cm1 associated with adjacent receiving electrodes Rx to identify the force position. In this way, it is possible that the force position being identified is at the region corresponding to the second drive electrodes Tx2. The first capacitance Cm1 associated with a first drive electrode Tx1 herein is referred to a first capacitance Ca11 generated by said first drive electrode Tx1 and an opposite receiving electrode Rx thereof. In addition, before identifying a touch position, the processor 50 performs interpolation on the variation of second capacitance Cm2 associated with adjacent receiving electrodes Rx to identify the touch position. In this way, it is possible that the touch position being identified is at the region corresponding to the second drive electrodes Tx2.

The second capacitance Cm2 associated with a second drive electrode Tx2 herein is referred to a second capacitance Cm2 generated by said second drive electrode Tx2 with a corresponding receiving electrode Rx thereof.

In another aspect, the force position is identified at a gravity center of multiple pixels (or receiving electrodes Rx) with variations of first capacitance Cm1 exceeding a first predetermined threshold, i.e. detecting a force. In this way, the force position may be between adjacent receiving electrodes Rx. The touch position is identified at a gravity center of multiple pixels (or receiving electrodes Rx) with variations of second capacitance Cm2 exceeding a second predetermined threshold, i.e. detecting a touch. In this way, the touch position may be between adjacent receiving electrodes Rx. The first predetermined threshold is identical to or different from the second predetermined threshold.

Figure 5B:
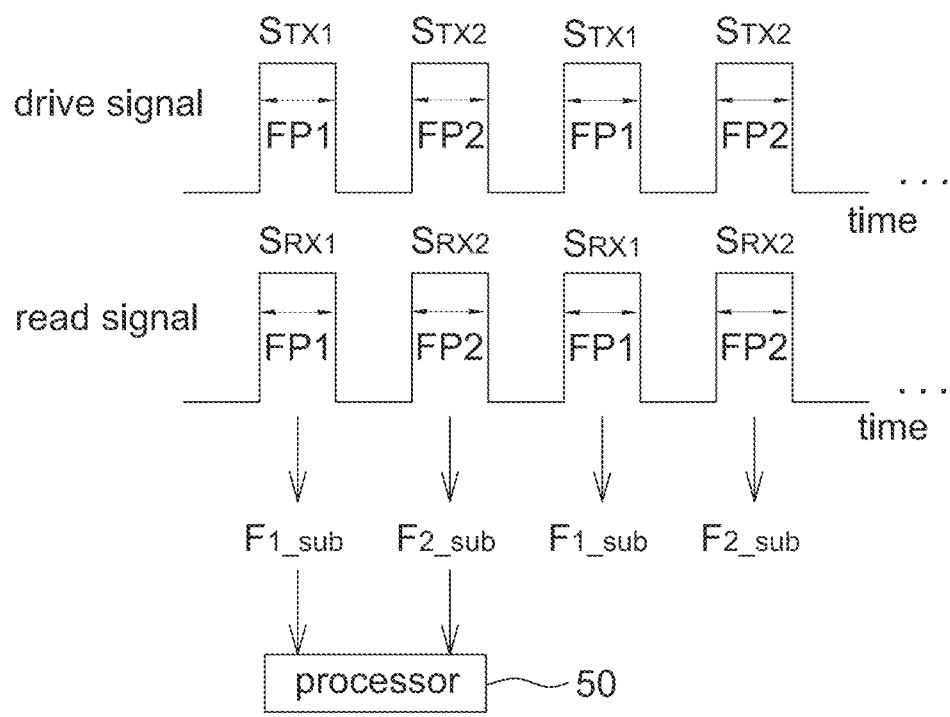
FIG. 5B is another signal timing diagram of a touch force sensor according to one embodiment of the present disclosure.

For example referring to FIGS. 5B and 3B, in another aspect, the control circuit 40 sends a first drive signal $S_{TX1}$ to each column of the plurality of first drive electrodes Tx1 within a first frame period FP1 via the first drive lines Tx1_drive and reads a first detection signal from each row of the plurality of receiving electrodes Rx via the readout lines Rx read (e.g., turning on reading switches using the read signal $S_{RX1}$) within the first frame period FP1. The control circuit 40 sends a second drive signal $S_{TX2}$ to each column of the plurality of second drive electrodes Tx2 within a second frame period FP2 via the second drive lines Tx2_drive and reads a second detection signal from each row of the plurality of receiving electrodes Rx via the readout lines Rx_read (e.g., turning on reading switches using the read signal $S_{RX2}$) within the second frame period FP2.

The first detection signals of all receiving electrodes Rx form a signal sub-framed $F_{1\_sub}$ within the first frame period FP1 for the processor 50 to obtain the force value and/or force position. The second detection signals of all receiving electrodes Rx form another signal sub-framed $F_{2\_sub}$ within the second frame period FP2 for the processor 50 to obtain the touch position. The processor 50 alternatively (e.g., within different frame periods) receives and processes the signal sub-frames $F_{1\_sub}$ and $F_{2\_sub}$ at a predetermined frequency. In FIG. 5B, each of FP1 and FP2 is one scan of the sensing panel in FIG. 4.

In the arrangement of FIG. 4, the receiving electrodes Rx are not opposite to the second drive electrodes Tx2. In one aspect, the processor 40 simultaneously drives three columns of second drive electrodes Tx2 that are adjacent to one receiving electrode Rx within the second frame period FP2 to obtain a detection signal of said one receiving electrode Rx. That is, the detection signal of said one receiving electrode Rx is a summation or an average of three second capacitances (e.g., the receiving electrode at an edge of the sensing panel) or four second capacitances (e.g., the receiving electrode not at an edge of the sensing panel).

Figure 6:
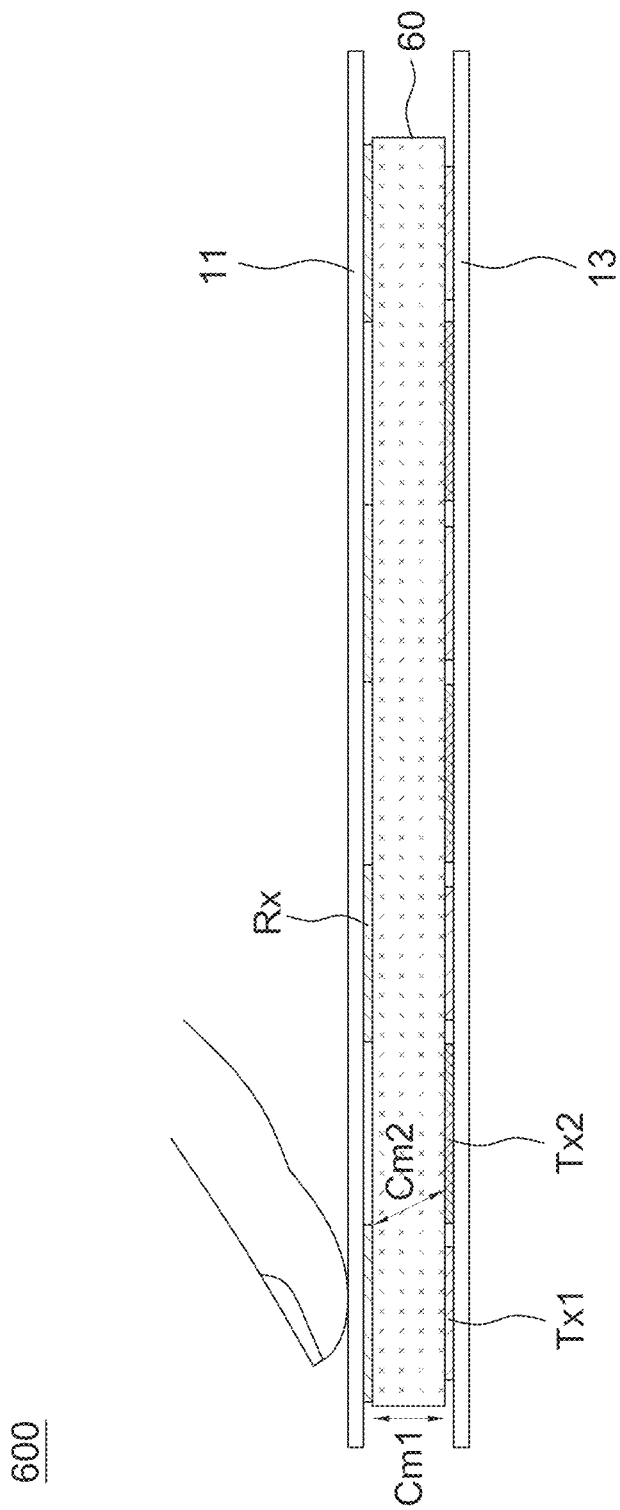
FIG. 6 is a cross-sectional view of a touch force sensor according to another embodiment of the present disclosure.

Please refer to FIG. 6, it is a cross sectional view of a touch force sensor 600 according to another embodiment of the present disclosure, whose difference from FIG. 1A is that the elastic layer 10 of FIG. 1A is replaced by a polymer material layer 60 to form the structure of FIG. 6. In this embodiment, the material of polymer material layer 60 is selected in the way that when the polymer material layer 60 is pressed, the dielectric constant thereof changes. Accordingly, when the polymer material layer 60 is arranged between powered two electrodes Rx and Tx1, the first capacitance Cm1 between the two electrodes Rx and Tx1 is changed (preferably Cm1 being increased) due to the change of dielectric constant of the polymer material layer 60 such that a force is detectable. Preferably, a larger force causes a larger change of the first capacitance Cm1. Similarly, the second capacitance Cm2 is decreased when a conductor approaches the sensing panel.

In this embodiment, in addition to arranging the polymer material layer 60 between the first substrate 11 and the second substrate 13 to have a dielectric constant change under force so as to change the first capacitance Cm1, the arrangement and the operation of other elements are similar to FIGS. 1A and 1B and thus details thereof are not repeated herein.

That is, in this embodiment, the first capacitance Cm1 is not changed due to a distance change between the first substrate 11 and the second substrate 13. When the finger gives a force on the first substrate 11, the distance between the first substrate 11 and the second substrate 13 is substantially not changed.

As shown in FIG. 6, the polymer material layer 60 is sandwiched between the first substrate 11 (regions without receiving electrodes Rx) and the second drive electrodes Tx2, and sandwiched between the receiving electrodes Rx and the first drive electrodes Tx1. Although FIG. 6 shows that the polymer material layer 60 is not directly in contact with a lower surface of the first substrate 11 and an upper surface of the second substrate 13, it is only intended to illustrate but not to limit the present disclosure. In another aspect, in the case that the second substrate 13 is under the first substrate 11, the polymer material layer 60 is in contact with the upper surface of the second substrate 13 outside the first drive electrodes Tx1 and the second drive electrodes Tx2, and is in contact with the lower surface of the first substrate 11 outside the receiving electrodes Rx.

In the present disclosure, as the finger putting on the first substrate 11 has a weight, a threshold (e.g., a voltage value or a charging/discharging interval) is set to be compared with a variation of the first capacitance Cm1. Only when the variation of the first capacitance Cm1 is larger than the threshold, a valid force is identified by the processor 50 of the control circuit 40.

As mentioned above, the conventional force sensor has the issues of lower user experience and larger thickness. Accordingly, the present disclosure further provides a touch force sensor (e.g., referring to FIGS. 1A, 1B and 6) that respectively detects the electric field change associated with different drive electrodes using the same receiving electrode to identify a touch or a force of a conductor. Since said different drive electrodes are arranged in the same layer on the substrate, the total thickness is significantly reduced.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A touch force sensor, comprising:
   a first substrate, arranged with a plurality of receiving electrodes thereon in an array;
   a readout line, connecting one row of receiving electrodes in a first direction;
   a second substrate, arranged with a plurality of first drive electrodes and a plurality of second drive electrodes in an array;
   a drive line, connecting one column of first drive electrodes and one column of second drive electrodes in a second direction, which is perpendicular to the first direction; and
   a control circuit, connecting to the one column of first drive electrodes and second drive electrodes via the drive line, and connecting to the one row of receiving electrodes via the readout line, wherein the control circuit is configured to
   send a first drive signal within a first frame period to the one column of first drive electrodes, and read a first detection signal of the one row of receiving electrodes within the first frame period, and
   send a second drive signal within a second frame period to the one column of second drive electrodes, and read a second detection signal of the one row of receiving electrodes within the second frame period.

2. The touch force sensor as claimed in claim 1, wherein the plurality of first drive electrodes and the plurality of second drive electrodes are arranged in a same layer on the second substrate.

3. The touch force sensor as claimed in claim 1, wherein the control circuit is further configured to
   identify a force according to first capacitance generated by the first drive electrodes and the receiving electrodes without according to second capacitance generated by the second drive electrodes and the receiving electrodes, and
   identify a touch according to the second capacitance without according to the first capacitance.

4. The touch force sensor as claimed in claim 1, further comprising an elastic layer disposed between the first substrate and the second substrate.

5. The touch force sensor as claimed in claim 1, wherein the plurality of first drive electrodes and the plurality of second drive electrodes are arranged in a chessboard pattern.

6. The touch force sensor as claimed in claim 1, further comprising an elastic layer disposed between the receiving electrodes and the first drive electrodes.

7. The touch force sensor as claimed in claim 1, wherein an area of each of the receiving electrodes is larger than an area of each of the first drive electrodes.

8. A touch force sensor, comprising:
   a plurality of receiving electrodes;
   a first substrate, arranged with the plurality of receiving electrodes thereon in an array;
   a plurality of first drive electrodes, arranged opposite to the plurality of receiving electrodes, and configured to generate a first capacitance with the plurality of receiving electrodes;
   a plurality of second drive electrodes, configured to generate a second capacitance with the plurality of receiving electrodes;
   a second substrate, arranged with the plurality of first drive electrodes and the plurality of second electrodes thereon in an array;
   a polymer material layer, arranged between the first substrate and the second substrate, and configured to have a dielectric constant variation while receiving a force to change the first capacitance;
   a readout line, connecting one row of receiving electrodes in a first direction;
   a drive line, connecting one column of first drive electrodes and one column of second drive electrodes in a second direction, which is perpendicular to the first direction; and
   a control circuit, connecting to the one column of first drive electrodes and second drive electrodes via the drive line, and connecting to the one row of receiving electrodes via the readout line, wherein the control circuit is configured to send a first drive signal within a first frame period to the one column of first drive electrodes, and read a first detection signal of the one row of receiving electrodes within the first frame period, and send a second drive signal within a second frame period to the one column of second drive electrodes, and read a second detection signal of the one row of receiving electrodes within the second frame period, wherein each of the plurality of receiving electrodes is fully overlapped with the opposite first drive electrode but is not overlapped with the plurality of second drive electrodes.

9. The touch force sensor as claimed in claim 8, wherein an area of each of the plurality of receiving electrodes is larger than an area of each of the plurality of first drive electrodes.

10. The touch force sensor in claim 8, wherein the control circuit is further configured to identify a force according to the first capacitance without according to the second capacitance, and identify a touch according to the second capacitance without according to the first capacitance.

11. The touch force sensor as claimed in claim 10, wherein the control circuit is further configured to identify a force position at a gravity center of multiple adjacent receiving electrodes with first capacitance variations exceeding a first predetermined threshold, and identify a touch position at a gravity center of multiple adjacent receiving electrodes with second capacitance variations exceeding a second predetermined threshold.

12. The touch force sensor as claimed in claim 8, wherein the polymer material layer is sandwiched between the first substrate and the plurality of second drive electrodes, and sandwiched between the plurality of receiving electrodes and the plurality of first drive electrodes.

13. The touch force sensor as claimed in claim 8, wherein the plurality of first drive electrodes and the plurality of second drive electrodes are arranged in a chessboard pattern on the second substrate.

14. The touch force sensor as claimed in claim 8, wherein the plurality of first drive electrodes and the plurality of second drive electrodes are arranged in a same layer on the second substrate.

15. A touch force sensor, comprising:

a first substrate, arranged with a plurality of receiving electrodes thereon in an array;

a readout line, connecting one row of receiving electrodes in a first direction;

a second substrate, arranged with a plurality of first drive electrodes and a plurality of second drive electrodes in an array;

a drive line, connecting one column of first drive electrodes and one column of second drive electrodes in a second direction, which is perpendicular to the first direction; and a control circuit, connecting to the one column of first drive electrodes and second drive electrodes via the drive line, and connecting to the one row of receiving electrodes via the readout line, wherein the control circuit is configured to send a drive signal within a frame period to the one column of first drive electrodes and second drive electrodes, and read a detection signal of the one row of receiving electrodes within the frame period.

16. A touch force sensor, comprising:

a plurality of receiving electrodes;

a first substrate, arranged with the plurality of receiving electrodes thereon in an array;

a plurality of first drive electrodes, arranged opposite to the plurality of receiving electrodes, and configured to generate a first capacitance with the plurality of receiving electrodes;

a plurality of second drive electrodes, configured to generate a second capacitance with the plurality of receiving electrodes;

a second substrate, arranged with the plurality of first drive electrodes and the plurality of second electrodes thereon in an array;

a polymer material layer, arranged between the first substrate and the second substrate, and configured to have a dielectric constant variation while receiving a force to change the first capacitance;

a readout line, connecting one row of receiving electrodes in a first direction;

a drive line, connecting one column of first drive electrodes and one column of second drive electrodes in a second direction, which is perpendicular to the first direction; and a control circuit, connecting to the one column of first drive electrodes and second drive electrodes via the drive line, and connecting to the one row of receiving electrodes via the readout line, wherein the control circuit is configured to send a drive signal within a frame period to the one column of first drive electrodes and second drive electrodes, and read a detection signal of the one row of receiving electrodes within the frame period.

\* \* \* \* \*